United States Patent [19]

Cogliano

[11] 4,293,679
[45] Oct. 6, 1981

[54] COMPOSITION AND METHOD OF CONTROLLING SOLID POLYURETHANE PARTICLE SIZE WITH WATER REACTANT

[75] Inventor: Joseph A. Cogliano, Pasadena, Md.

[73] Assignee: W. R. Grace & Co., New York, N.Y.

[21] Appl. No.: 153,307

[22] Filed: May 27, 1980

Related U.S. Application Data

[63] Continuation-in-part of Ser. No. 47,973, Jun. 13, 1979, abandoned.

[51] Int. Cl.³ .............................................. C08G 18/08
[52] U.S. Cl. .............................. 528/48; 260/29.2 TN; 260/30.8 DS; 260/30.2; 260/31.2 N; 260/32.4; 260/32.6 NR; 260/33.4 UR; 525/452; 525/454; 528/49; 528/52; 528/53; 528/72; 528/76; 528/77
[58] Field of Search .................... 528/76, 77, 48, 72, 528/49, 52, 53; 260/32.8 N, 33.4 UR, 30.8 DS, 32.6 NR, 32.4, 31.2 N, 30.2, 29.2 TN

[56] References Cited

U.S. PATENT DOCUMENTS

| | | | |
|---|---|---|---|
| 2,901,467 | 8/1959 | Croco | 528/76 |
| 3,402,149 | 9/1968 | Walters | 528/44 |
| 3,655,627 | 4/1972 | Hutzler et al. | 528/48 |
| 3,822,238 | 7/1974 | Blair et al. | 528/76 |
| 3,850,880 | 11/1974 | Hakanson et al. | 528/48 |
| 3,939,123 | 2/1976 | Mathews et al. | 528/76 |
| 4,108,954 | 8/1978 | Hilterhaus et al. | 260/32.8 N |
| 4,145,515 | 3/1979 | Pogozelski et al. | 260/32.8 N |

*Primary Examiner*—Harold D. Anderson
*Attorney, Agent, or Firm*—Richard P. Plunkett; William W. McDowell, Jr.

[57] ABSTRACT

This invention relates to control of particle size of solid, discrete, hydrophilic, crosslinked polyurethane particles formed from a composition which comprises
(a) a water reactant;
(b) a prepolymer comprising at least one isocyanate-capped polyol having a reaction functionality of at least two, the total of said polyol present having an ethylene oxide content of at least 40 weight percent before capping;
(c) a water-soluble solvent for (b) and
(d) when the reaction functionality of (b) is two, a crosslinking agent containing at least three functional groups, the volume ratio of (a):(b) being at least 2:1.

12 Claims, No Drawings

COMPOSITION AND METHOD OF CONTROLLING SOLID POLYURETHANE PARTICLE SIZE WITH WATER REACTANT

This application is a continuation-in-part of copending application having Ser. No. 047,973, filed June 13, 1979, now abandoned.

BACKGROUND OF THE INVENTION

This invention relates to control of particle size of new, improved, hydrophilic, crosslinked polyurethane solid, discrete particles and to a method for their preparation. More particularly, the present invention relates to hydrophilic solid particles prepared from a capped polyoxyethylene polyol reactant having a defined average reaction functionality greater than two and being dissolved in a water-soluble solvent which is then admixed and reacted with large amounts of an aqueous reactant.

Numerous attempts have been made in the prior art to produce hydrophilic polyurethane particles. Typical methods of forming polymeric particles or polymers have been described in the literature. Solution, suspension and emulsion polymerization have been used to form particles of the desired size. Techniques for such preparations are described in The Encyclopedia of Polymer Science and Technology, 1972, John Wiley & Sons, Inc., under the Topics *Suspension Polymerization* at pg. 552 of Vol. 13 and *Ion Exchange Polymers—Synthesis and Characteristics* at pg. 700 of Vol. 7. Polymeric powders have also been formed by mechanical working or solution methods as described in the same text under *Powder Coatings* at pg. 544, Vol. 1, of the 1976 Supplement. The particles can be formed by pelletizing, granulating, spray-drying or chemical precipitation.

The formation of polymer particles in situ having an average diameter in the range 0.1-100 mils by the reaction of prepolymer polyurethanes being added to an aqueous medium is set forth in copending application having Ser. No. 44,808, filed June 1, 1979, assigned to the same assignee and incorporated herein by reference in its entirety. The instant invention sets forth a composition and method of reducing the size of the discrete, solid, hydrophilic crosslinked polyurethane particles formed therein.

DESCRIPTION OF THE INVENTION

It has now been surprisingly found that improved, new, hydrophilic, crosslinked polyurethane solid, discrete particles of reduced size may be prepared simply by adding and reacting a particular isocyanate-capped polyoxyethylene polyol dissolved in a water-soluble solvent with large amounts of an aqueous reactant. The thus generated solid, discrete particles of reduced size are typically characterized by having a crosslinked, i.e., non-linear, molecular network, which provides the solid particle product with a broad spectrum of improved properties.

Generally stated, the present solid, discrete, hydrophilic, crosslinked polyurethane particles of reduced size are prepared from a composition which comprises (a) a water reactant;
(b) a prepolymer comprising at least one isocyanate-capped polyol having a reaction functionality of at least two, the total of said polyol present having an ethylene oxide content of at least 40 weight percent before capping;
(c) a water-soluble solvent for (b) and
(d) when the reaction functionality of (b) is two, a crosslinking agent containing at least three functional groups, the volume ratio of (a):(b) being at least 2:1.

The solvent (c) supra must not only dissolve prepolymer (b) therein but must also be water-soluble and non-reactive in the particle-forming reaction. Solvents meeting these requirements include, but are not limited to, lower alkyl ketones such as acetone and methyl ethyl ketone. Also operable herein as solvents are dimethylsulfoxide, acetonitrile, methyl acetate, dimethylformamide and N-methylpyrrolidone. Even water-soluble solvents which react slowly with the prepolymer are operable if they are added to the system just prior to reacting the prepolymer with the water reactant. Such solvents include the lower alkyl alcohols such as methyl alcohol, ethyl alcohol and propyl alcohol. Mixtures of the above listed solvents are also operable herein. The amount of solvent used herein to reduce particle size can vary between wide limits. The amount of solvent can range from 20 to 99% by weight of the prepolymer solution (b+c), preferably between about 30 and 90% by weight of the prepolymer solution.

The solvent functions to reduce the viscosity of the prepolymer thus changing the characteristics of the final reaction-formed particle. Reducing the viscosity by this means allows for smaller droplets of prepolymer-containing solvent to enter the water reactant which result in still smaller final formed solid, discrete, hydrophilic, crosslinked polyurethane particles due to removal of the solvent.

Various combinations of (b), per se, or with (d) supra are operable to form particle-forming prepolymers operable in the present invention. One example to form (b) supra would be to cap a polyoxyethylene containing diol with a diisocyanate such that the capped product had a reaction functionality of 2. Since this material, per se, will not yield a crosslinked particle on addition of a water reactant, it is necessary to add thereto either (1) a diol capped with a polyisocyanate having a functionality greater than two, e.g., benzene-1,3,5-triisocyanate;
(2) a polyol containing at least 3 OH groups capped with a di- or polyisocyanate;
(3) an isocyanate-reactive crosslinking agent such as one having from 3 up to 6 or more reactive amine, hydroxy, thiol or carboxylate sites per average molecule which can also be added to the water reactant or
(4) a combination of (1) and (2).

Other examples of (b) operable herein to form particles of reduced size would be (1) or (2) supra, per se, or blended together with or without (3).

When two or more isocyanate-capped polyols are blended to form (b), the ethylene oxide present in the polyol or blend of polyols can be present in only one polyol, some of the polyols or in each polyol as long as the amount is equal to at least 40 weight percent of the polyols present before capping with the di- or polyisocyanate.

The present crosslinked hydrophilic solid, discrete particles may be prepared by capping polyoxyethylene polyol with a polyisocyanate such that the capped product has a reaction functionality greater than two. The capped product is then dissolved in the water-soluble solvent and is formed into solid discrete particles simply by being added to and reacting with an aqueous reactant. Optionally, the capped product and/or aqueous reactant may contain a suitable crosslinking agent, if desired, in which case the capped polyoxyethylene polyol product may have a functionality approximating two.

During capping it is desirable that polyisocyanate be reacted with the polyol such that the reaction product, i.e., the capped product, is substantially void of reactive hydroxy groups while containing more than two reactive isocyanate sites per average molecule.

Another route for achieving this desired result is to react, during the particle forming reaction, an isocyanate-capped diol having two reactive active isocyanate sites per average molecule, in a reaction system containing a polyfunctional reactive component, such as one having from three up to six or more reactive amine, hydroxy, thiol or carboxylate sites per average molecule. These latter sites are highly reactive with the two reactive isocyanate sites.

Polyoxyethylene polyol used as a reactant in preparing the capped product to be formed into solid particles by reaction with and addition to water may have a number average molecular weight of about 200 to about 20,000, and preferably between about 600 to about 6,000, with a hydroxyl functionality of about two or greater, preferably from about 2 to about 8. The number average molecular weight is calculated by measurement of the hydroxyl content of the polyol from the formula:

$$M_n = (56.1 \times 1000 \times \text{functionality})/(\text{OH No.})$$

Polyoxyethylene polyol is terminated or capped by reaction with a polyisocyanate. The reaction is preferably carried out in an inert moisture-free atmosphere such as under a nitrogen blanket, at atmospheric pressure at a temperature in the range of from about 0° C. to about 120° C. for a period of time of up to about 80 hours depending upon the temperature and degree of agitation. This reaction may be effected also under atmospheric conditions provided the product is not exposed to excess moisture. The polyisocyanates used for capping the polyoxyethylene polyol include PAPI (a polyaryl polymethylene-polyisocyanate as defined in U.S. Pat. No. 2,683,730), tolylene diisocyanate, triphenylmethane-4,4',4''-triisocyanate, benzene-1,3,5-triisocyanate, toluene-2,4,6-triisocyanate, diphenyl-2,4,4'-triisocyanate, hexamethylene diisocyanate, xylene diisocyanate, chlorophenylene diisocyanate, diphenylmethane-4,4'-diisocyanate, naphthalene-1,5-diisocyanate, xylene-alpha, 3,3'-dimethyl-4,4'-biphenylene diisocyanate, 3,3'-dimethoxy-4,4'-biphenylene diisocyanate, 2,2',5,5'-tetramethyl-4,4'-biphenylene diisocyanate, 4,4'-methylene bis(phenylisocyanate), 4,4'-sulfonyl bis(phenylisocyanate), 4,4'-methylene di-orthotolylisocyanate, ethylene diisocyanate, trimethylene diisocyanate, diicyclohexyl methane-4,4'-diisocyanate, isophorone diisocyanate, 1,6-hexamethylene diisocyanate, 2,2,4-trimethyl-1,6-hexane diisocyanate and the like. Mixtures of any one or more of the above mentioned organic isocyanates may be used as desired. The aromatic diisocyanates, aliphatic and cycloaliphatic diisocyanates and polyisocyanates or mixtures thereof which are especially suitable are those which are readily commercially available, have a high degree of reactivity and a relatively low cost.

Capping of the polyoxyethylene polyol may be effected using stoichiometric amounts of reactants. Desirably, however, an excess of polyisocyanate is used to insure complete capping of the polyol. Thus, the ratio of isocyanate groups to the hydroxyl groups used for capping is between about 1 to about 4 isocyanates per hydroxyl.

Isocyanate-capped polyoxyethylene polyol reaction products (prepolymers) employed in the present invention may be exemplified as follows. First, when water is the sole reactant with the isocyanate groups of the prepolymer during the solid particle forming process, the isocyanate-capped polyoxyethylene polyol reaction product must have an average isocyanate functionality greater than two and up to about eight or more depending upon the composition of the polyol and capping agent components. Secondly, when the isocyanate-capped polyoxyethylene polyol has an isocyanate functionality of only about two, then the water or aqueous reactant used may contain a dissolved or dispersed isocyanate-reactive crosslinking agent having an effective functionality greater than two. In this latter case, the reactive crosslinking agent is reacted with the capped polyoxyethylene polyol when admixed and during the particle forming process.

Conventional water soluble or water dispersible isocyanate-reactive crosslinking agents having an active functionality greater than two include those containing amine, hydroxyl, thiol and carboxylate groups. Examples of such crosslinking agents include, but are not limited to, ethylene diamine, diethylene, triamine, n-methyl ethylene diamine, trimethylpropane, trimethylolethane, glycerol, 1,2,6-hexane triol, cyclopentane-tetracarboxylic acid, 1,3,5-benzene tricarboxylic acid, citric acid, trimethylolpropane tris($\beta$-mercaptopropionate) and pentaerythritol tetrakis($\beta$-mercaptopropionate), triethylenetetramine, tetraethylenepentamine, polyethyleneimine, pentaerythritol, tolylene-2,4,6-triamine, amino-ethanol, trimethylenediamine, tetramethylenediamine, pentamethylenediamine, hexamethylenediamine, ethanolamine, diethanolamine, hydrzine, triethanolamine, benzene-1,2,4-tricarboxylic acid, nitrilotriacetic acid and 4,4'-methylenebis(o-chloroaniline).

Thirdly, when the isocyanate-capped polyoxyethylene polyol has an isocyanate functionality of only about two, then a polyisocyanate crosslinking agent having an isocyanate functionality greater than two may be incorporated therein, either preformed or formed in situ, and the resultant mixture is dissolved in the water-soluble solvent and may then be reacted with water or aqueous reactant, optionally containing a dissolved or dispersed reactive isocyanate-reactive crosslinking agent, leading to a crosslinked, hydrophilic polyurethane particle of reduced size.

Several different modes may be used to prepare the prepolymer, i.e., the hydrophilic capped polyoxyethylene polyol reaction product having an average isocyanate functionality greater than two. In forming the prepolymer, blends or mixtures of the various polyols and/or polyisocyanates may be used as desired so long as the total average isocyanate functionality of the final urethane containing reaction product is greater than two and the ethylene oxide content of the polyol is at least 40 weight percent prior to capping.

One useful mode is to polymerize ethylene oxide in the presence of a polyfunctional hydroxyl containing starter component, such as glycerol, trimethylolpropane or trimethylolethane, which leads to polyoxyethylene triols. The molecular weight of these polymeric triols may be varied greatly, depending on the number of moles of ethylene oxide used in the reaction with the starter component. Starter components such as pentaerythritol and sucrose likewise treated with ethylene oxide lead to polymeric polyoxyethylene tetrols and hexols, respectively. Alternatively, polyols suitable for capping with polyisocyanate may be prepared from diols, triols, tetrols, hexols and polycarboxylic acids.

A second possible method for preparing the prepolymer is by reacting polyoxyethylene glycol having a reactive functionality equal to two with a molar excess of a diisocyanate which leads to an isocyanate-capped polyurethane product (A) having an isocyanate functionality of two. A polyol such as pentaerythritol having a reactive functionality equal to four is reacted with a large molar excess of a diisocyanate to form an isocyanate-capped polyurethane intermediate product (B) having an isocyanate functionality of four. By blending the two isocyanate-capped products thus prepared, i.e., products (A) and (B), in various molar proportions, the resulting product mixture has an average isocyanate functionality greater than two and after dissolution in the water-soluble solvent and on treatment with aqueous reactants will lead to the hydrophilic crosslinked polyurethane solid particles of the present invention. In addition, other monomeric or polymeric polyisocyanate crosslinking agents may be substituted for the tetraisocyanate product (B). Tolylene-2,4,6-triisocyanate having a reactive functionality of three is an example of a simple monomeric triisocyanate which may be usefully employed to achieve the same objective of imparting to the system an average isocyanate functionality greater than two.

A third method for preparing the prepolymer is to blend a generally linear polyol with a polyol having at least 3 and preferably from 3 to 8 hydroxyl groups (e.g., trimethylolpropane, trimethylolethane, glycerol, pentaerythritol or sucrose). Generally, monomeric polyols having 3 or 4 hydroxylgroups per mole are employed. The blend is reacted with a sufficient amount of a polyisocyanate so that the resulting prepolymer is substantially void of unreacted hydroxyl groups, i.e., an excess of the polyisocyanate is preferably employed. The excess of polyisocyanate can range up to the point where about 4 isocyanate groups are employed for each hydroxyl group.

A fourth method would be to blend any combination of the prepolymer described in the first method with the constituents described in the second or third method either individually or collectively.

It has also been found that the capped polyoxyethylene polyol having an isocyanate functionality greater than two used to prepare a three-dimensional network polymer must be present in an amount sufficient to insure formation of the three-dimensional network. Thus, amounts of the capped polyoxyethylene polyol having an isocyanate functionality greater than two in the component to be formed into particles range from about 3% by weight of this component up to 100% by weight. Hence, it is possible to include an isocyanate capped diol having an isocyanate functionality of two, e.g., polyethylene glycol capped with toluene diisocyanate in an amount from 0% by weight up to about 97% by weight of the component to be formed into solid particles. The maximum amounts of diisocyanate used are limited to that necessary to permit crosslinking to take place during the particle forming reaction, as contrasted to formation of a linear polymeric structure.

The polyoxyethylene polyols used in this invention are water-soluble reaction products derived fom the polymerizationof ethylene oxide in the presence of a polyfunctional starter compound such as water, ethylene glycol, glycerol, pentaerythritol, sucrose and the like. The molecular weights may be varied over a wide range by adjusting the relative ratios of ethylene oxide monomer to starter compound. The preferred molecular weight ranges have been described previously.

It is possible and sometimes desirable to incorporate various amounts of a relatively hydrophobic comonomer into the ethylene oxide based polymerization products. Thus, comonomers such as propylene oxide or butylene oxide may be copolymerized as a random copolymer, block-copolymer or both, such that the copolymers remain hydrophilic while having other desirable features for certain applications, namely, improved low temperature flexibility and hydrolytic stability. Up to about 40-60 weight percent, but desirably about 25-45 weight percent of the relatively hydrophobic comonomer, may be copolymerized with the ethylene oxide monomer and still yield hydrophilic crosslinked solid polyurethane particles when those products are used as polyol intermediates in practicing the present invention. Thus, throughout the text of this document, the term "polyoxyethylene polyol" is intended to include not only homopolymers of ethylene oxide but also hydrophilic copolymers of ethylene oxide such as those described above wherein all of these polyol derivatives have a hydroxyl functionality of about two or greater and an ethylene oxide content ranging from about 40 weight percent to about 100 weight percent and preferably greater than about 55 weight percent.

To effect solid particle formation and preparation of the crosslinked network polymer, the prepolymer or resin reactant in its water-soluble solvent is simply added to and reacted with a particular aqueous component. For simplicity, this isocyanate-capped reaction component will occasionally be referred to herein as "resin reactant". Soluble polar solvents may be used in conjunction with water including, but not limited to, propylene glycol, ethylene glycol and polyethylene and polypropylene glycols.

The aqueous component may be water, a water slurry or suspension, a water emulsion or a water solution having water soluble materials disposed therein. For convenience, the aqueous component is referred to herein as an aqueous reactant.

In contrast to typical polyurethane reactions such as those using catalyst or like promoters where one mole of —NCO is reacted with one half mole water, the present reaction proceeds simply with large excesses of water with the prepolymer solution added at a controlled rate and temperature to a water reservoir.

The reaction temperature to effect solid particle formation obviously is regulated by the viscosity of the solution of the resin reactant. The reaction may proceed either as a batch reaction or as a continuous reaction. The resin reactant solution must either be added to the aqueous reactant or both may be combined simultaneously such as when using spray techniques but with high volume ratios of water to prepolymer, at least 2:1. Obviously, the volume ratio of water reactant to prepolymer can be infinite, but for recovery purposes a water:prepolymer volume ratio in the range 2-200:1 is preferred. Lesser amounts of water than the amounts given in the volume ratio tend to lead to agglomeration of the individual particles and in some instances to foaming.

Because large amounts of water are in the aqueous reactant during reaction, i.e., the present invention is not dependent upon a stoichiometric molar NCO-water type reaction, it is possible to combine a great variety of materials in the aqueous reactant which are otherwise not possible with limited water reacting systems.

The aqueous reactant may be used at temperatures from slightly above 0° C. to about 100° C. as desired. This temperature can be readily determined and can be modified by the use of catalysts in the aqueous phase. It is possible also to effect reaction of the resin reactant in the water-soluble solvent using water vapor or steam as the aqueous component.

In practicing the invention the amount of agitation employed when the prepolymer in solution is added to the water reactant should be sufficient to insure discrete particle formation from each prepolymer solution addition prior to successive prepolymer solution additions. That is, if the prepolymer solution is added in drops, the agitation should be sufficient to form particles from each drop prior to a successive drop contacting the agitated water reactant. Thus, it is preferable to sweep the prepolymer solution out of the water entry zone before the next droplet appears. Agitation as low as 30 revolutions per minute is operable to form particles by the instant invention. Generally speaking, all else being equal, the higher the agitation the smaller the particle formed. As is well known to those skilled in the art, other factors can be varied to control particle size such as rate of addition of prepolymer solution to the agitated water base, size of the liquid prepolymer solution droplet being added and rate of reaction of the prepolymer with the water which can be accelerated by the use of catalyst.

Large amounts of many water soluble or water dispersible materials may be added to the aqueous reactant. These materials may be added to the aqueous reactant up to about 800% by weight of the amount of water in the aqueous reactant, depending, of course, on the particular material and its weight. Useful additives to the aqueous reactant include organic and inorganic salts, alcohols, amines, acids, polymer latices, resin or wax dispersions, flame retardants, fungicides, fillers, blowing agents, fibers, cellulosics, surfactants, pigments, dyes, zeolites, nutrients, sorbents, chelates, hydrogenation or cracking catalysts, thickeners, stabilizers, promoters or the like. By homogeneously distributing these materials in the aqueous reactant, it is possible to effect wide distribution of these materials throughout the finally prepared particle. Some or all of the above additives may also be combined into the resin reactant, if desired.

Catalysts, antioxidants and other chemical reactants may be incorporated into the particles generated by practice of this invention. Such structures find effective use in a variety of chemical applications including catalystic reactions, fuel cells, water or blood purification, extraction applications, in separation systems and the like.

A wide variety of solid materials may be added to the present particles to produce changes in properties, particularly to improve final molding or coating characteristics. These solid materials which may be added include finely divided solid particles or powders, powdered metals, activated charcoal, carbon blacks, granular or particulate solids and fibrous materials. Suitable fillers of this type include barium sulfate, alumina hydrate, zircon sand, calcium carbonate and the like and organic fillers.

Various conventional radiation barrier materials such as lead, boron hydrides, hafnium titanate and the like may also be combined with the present particles by way of the aqueous reactant.

The hydrophilic, crosslinked, polyurethane, solid, discrete particles formed by the present invention may have average diameters in the range 30 Angstroms (A) to 0.25 cm. Generally stated, all else being equal, the greater the weight percent of water-soluble solvent used, the greater the reduction in size of the final polyurethane particle formed.

The following examples will aid in explaining, but should not be deemed as limiting, the practice of the present invention. In all cases, unless otherwise noted, all parts and percentages are by weight.

EXAMPLE 1

A prepolymer was prepared by admixing 2 molar equivalents of polyethylene glycol having an average molecular weight of 1,000 (PEG-1,000) and 1 molar equivalent of trimethylolpropane (TMOP). The admixture was dried at 100°–110° C., under a pressure of 5–15 Torr to remove water. The resulting dried mixture was slowly added over a period of about 1 hour to a vessel containing 6.65 molar equivalents of toluene diisocyanate (TDI) while stirring the TDI and polyol mixture. The temperature was maintained at 60° C. The mixture was maintained at 60° C. with stirring for 3 additional hours. Then an additional 1.05 molar equivalent of TDI was added with stirring over a period of about 1 hour while maintaining the temperature at 60° C. The final reaction mixture contained a 10% molar excess of TDI. All hydroxyl groups were capped with isocyanate and some chain extension occurred due to both NCO groups on a TDI molecule reacting with OH groups on the diol. This prepolymer will be referred to herein as Prepolymer A.

EXAMPLE 2

20 g of Prepolymer A from Example 1 were dripped into a Waring blender containing 400 ml of water being stirred at high agitation (2,100 rpm). After stirring for a few minutes, the solid, crosslinked polyurethane particle product was filtered wet through sieves to give the following screen classification by weight:

| Average Particle Diameter Mils | Weight Percent |
| --- | --- |
| less than 11 | 23.0 |
| 11–16 | 37.1 |
| 16–33 | 39.9 |

EXAMPLE 3

A solution containing 10 g of Prepolymer A from Example 1 in 10 g of acetone was slowly added by pouring into a Waring blender containing 300 ml water and being agitated at about 2,100 rpm. After stirring for a few minutes the solid crosslinked hydrophilic polyurethane particle product was filtered wet through sieves to give the following screen classification by weight:

| Average Particle Diameter Mils | Weight Percent |
| --- | --- |
| less than 11 | 48.0 |
| 11–16 | 29.0 |
| 16–33 | 23.0 |

EXAMPLE 4

Example 3 was repeated except that 2 g of Prepolymer A from Example 1 in 18 g of acetone was employed. The resultant solid crosslinked hydrophilic polyurethane particle product after wet screening resulted in the following screen classification:

| Average Particle Diameter Mils | Weight Percent |
| --- | --- |
| less than 11 | 100 |

EXAMPLE 5

A solution containing 20 g of Prepolymer A from Example 1 in 200 g of acetone was slowly added by pouring to a Waring blender containing 300 ml water and being highly agitated. The resultant solid, crosslinked polyurethane particle product had an average diameter size of less than 11 mils.

EXAMPLE 6

A solution of 20 g of Prepolymer A from Example 1 in 10 g of acetone was added to 500 g of water containing 5 g of a biodegradable detergent sold under the tradename "Liqui-Nox" by Alconox Inc. stirred by a sonic cell emulsifier manufactured by Bronwill. The mix was stirred for 15 minutes with periodic addition of ice to prevent overheating. A non-settling dispersion of discrete, solid, hydrophilic, crosslinked polyurethane particles in water resulted. A sample was dried in air at room temperature to give a 15–20 mil thick film.

Use of a surfactant in combination with the water-soluble solvent for the prepolymer will reduce even further the polyurethane particle size as shown in the following example:

EXAMPLE 7

A solution containing 20 g of Prepolymer A from Example 1, 10 g of acetone and 2 g of dioctyl ester of sodium sulfosuccinic acid sold under the tradename "Aerosol OT-75" by American Cyanamid Co. was slowly poured into 500 g of water containing 2 g of "Aerosol OT-75" in a sonic cell emulsifier. A dispersion of discrete, solid, hydrophilic, crosslinked polyurethane particles in water resulted. The slightly blue cast of the dispersion (Tyndall effect) indicates particles even smaller in particle size than in Example 6, i.e., less than 300 A.

The polyurethane particles of the instant invention can be used to coat various substrates including, but not limited to, plastic, wood, metal, e.g., aluminum, steel and copper, brick, ceramic, glass, cloth, fabric, fibrous webs and other porous substrates, floor tiles and the like. Other uses include, but are not limited to, adhesives, caulks, elastomeric sealants and the like.

I claim:

1. A process for forming solid, discrete, hydrophilic, crosslinked, polyurethane particles of reduced size which comprises adding
(a) a hydrophilic prepolymer comprising an isocyanate-capped polyol or mixture of isocyanate-capped polyols wherein said isocyanate-capped polyol or mixture of polyols has a reaction functionality greater than 2, the total of said polyol present having an ethylene oxide content of at least 40 weight percent before capping;
(b) said prepolymer (a) being dissolved in a water soluble solvent, to
(c) an agitated water reactant,
the volume ratio of (c):(a) being at least 2:1.

2. The process of claim 1 wherein the water-soluble solvent (b) is present in an amount ranging from 20 to 99% by weight of the prepolymer solution of (b) and (a).

3. The process of claim 1 wherein the water-soluble solvent is a member of the group consisting of acetone, methyl ethyl ketone, dimethylsulfoxide, dimethylformamide, n-methylpyrrolidone, acetonitrile, methyl acetate and mixtures thereof.

4. The process according to claim 1 containing an excess of polyisocyanate up to about four isocyanate groups/OH group in the polyol.

5. The process according to claim 1 wherein said prepolymer is the reaction product of a polyether polyol with sufficient polyisocyanate to provide at least two free NCO groups per molecule of the prepolymer.

6. The process according to claim 1 in which the isocyanate-capped polyol is prepared by reacting toluene diisocyanate and a polyethylene glycol.

7. The process according to claim 1 in which the isocyanate-capped polyol is prepared by reacting toluene diisocyanate and a polyethylene glycol having a molecular weight of about 1,000.

8. The process according to claim 1 in which the prepolymer is prepared by reacting toluene diisocyanate and a member selected from the group consisting of a polyoxyethylene-polyoxybutylene polyol, ethylene glycol, diethylene glycol, a polyoxyethylene polyol, a polyoxyethylene-polyoxypropylene polyol and mixtures thereof.

9. The process according to claim 1 in which the prepolymer is prepared by reacting toluene diisocyanate with an admixture of a polyethylene glycol having a molecular weight in the range 200–2,000 and trimethylolpropane, the trimethylolpropane and the polyethylene glycol being provided in a mole ratio of about 1:1–4 and the toluene diisocyanate being provided in an amount up to four isocyanate groups/OH group provided by the polyethylene glycol and the trimethylolpropane.

10. The process according to claim 1 wherein the prepolymer is an isocyanate-capped polyoxyethylene polyol having a number average molecular weight in the range 200 to 20,000 before capping, said number average molecular weight being calculated by measurement of the hydroxyl content of the polyol from the formula:

$$M_n = (56.1 \times 1000 \times \text{functionality})/(\text{OH No.}).$$

11. The process according to claim 10 wherein the number average molecular weight is in the range 600 to 6,000.

12. The process of claim 1 wherein the polyurethane particles formed have an average diameter in the range 30 A to 0.25 cm.

* * * * *